United States Patent
Bennett et al.

(10) Patent No.: US 11,294,827 B2
(45) Date of Patent: Apr. 5, 2022

(54) NON-SEQUENTIAL ZONED NAMESPACES

(71) Applicant: Western Digital Technologies, Inc., San Jose, CA (US)

(72) Inventors: Alan D. Bennett, Edinburgh (GB); Matias Bjorling, Copenhagen (DK); Daniel L. Helmick, Broomfield, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 39 days.

(21) Appl. No.: 16/703,643

(22) Filed: Dec. 4, 2019

(65) Prior Publication Data

US 2021/0081330 A1    Mar. 18, 2021

Related U.S. Application Data

(60) Provisional application No. 62/899,717, filed on Sep. 12, 2019.

(51) Int. Cl.
*G06F 12/1081* (2016.01)
*G06F 12/02* (2006.01)
*G06F 3/06* (2006.01)

(52) U.S. Cl.
CPC ........ *G06F 12/1081* (2013.01); *G06F 3/0604* (2013.01); *G06F 3/064* (2013.01);
(Continued)

(58) Field of Classification Search
None
See application file for complete search history.

(56) References Cited

U.S. PATENT DOCUMENTS

| 7,526,599 B2 | 4/2009 | Chang et al. |
| 8,103,841 B2 | 1/2012 | Sinclair et al. |

(Continued)

FOREIGN PATENT DOCUMENTS

WO    2017195928 A1    11/2017

OTHER PUBLICATIONS

International Search Report and the Written Opinion for International Application No. PCT/US2020/023171 dated Jul. 2, 2020, 14 pages.

(Continued)

*Primary Examiner* — Yaima Rigol
(74) *Attorney, Agent, or Firm* — Patterson & Sheridan, LLP; Steven H. Versteeg

(57) ABSTRACT

The present disclosure generally relates to methods of operating storage devices. A controller of the storage device is configured to retrieve a first command to write data to one or more first logical blocks of a first zone, and direct memory access (DMA) read and write the data associated with the first command to the first logical blocks. The first logical blocks are between a zone starting point of the first zone and a zone capacity of the first zone. The controller is configured to retrieve a second command to write data to one or more second logical blocks of the first zone, and DMA read and write the data associated with the second command to the second logical blocks. The second logical blocks are between the zone starting and the zone capacity of the first zone, and the first logical blocks are non-sequential to the second logical blocks.

20 Claims, 9 Drawing Sheets

(52) U.S. Cl.
CPC .......... *G06F 3/0659* (2013.01); *G06F 3/0673* (2013.01); *G06F 12/0246* (2013.01)

(56) References Cited

U.S. PATENT DOCUMENTS

| | | |
|---|---|---|
| 2005/0144358 A1 | 6/2005 | Conley et al. |
| 2006/0020745 A1* | 1/2006 | Conley ............... G06F 12/0246 711/103 |
| 2008/0071969 A1 | 3/2008 | Lin |
| 2008/0235464 A1* | 9/2008 | Traister ............... G06F 12/0246 711/154 |
| 2008/0235489 A1 | 9/2008 | Gorobets |
| 2009/0019218 A1 | 1/2009 | Sinclair et al. |
| 2009/0113121 A1 | 4/2009 | Lee et al. |
| 2013/0173857 A1* | 7/2013 | Cheon ..................... G06F 3/064 711/103 |
| 2014/0189264 A1* | 7/2014 | George ................. G06F 3/0611 711/154 |
| 2015/0212752 A1* | 7/2015 | Nemazie ............... G06F 3/0616 711/103 |
| 2016/0062885 A1* | 3/2016 | Ryu ..................... G06F 12/0246 711/103 |
| 2016/0239205 A1* | 8/2016 | Roth ........................ G06F 3/064 |
| 2017/0337212 A1* | 11/2017 | Hayasaka ............... G06F 3/067 |
| 2018/0052625 A1* | 2/2018 | Cho ....................... G06F 3/0659 |
| 2018/0247947 A1* | 8/2018 | Kanno .................... G06F 12/06 |
| 2019/0102291 A1* | 4/2019 | Zhou ..................... G06F 3/0659 |
| 2019/0272229 A1* | 9/2019 | Halumi ............... G06F 12/0238 |

OTHER PUBLICATIONS

"Information Technology—Zoned Device ATA Command Set (ZAC)." Edited by Ralph O. Weber, Draft Proposed American National Standard, International Committee for Information Technology Standards, (INCITS) Project T13/BSR INCITS 537, Dec. 16, 2015, 86 pages, <http://www.t13.org/Documents/UploadedDocuments/docs2015/di537r05-Zoned_Device_ATA_Command_Set_ZAC.pdf>.

"Symphonic Zones—Cooperative Flash Zones." Radian Memory Systems, Product Overview, Feb. 2019, 5 pages, www.radianmemory.com/wp-content/uploads/2019/02/Symphonic_Zones_Product_Overview_v1.pdf.

Wu et al. "Evaluating host aware SMR drives," 2016, In Proceedings of the 8th USENIX Conference on Hot Topics in Storage and File Systems (HotStorage'16). USENIX Association, Berkeley, CA, USA, 5 pages.

* cited by examiner

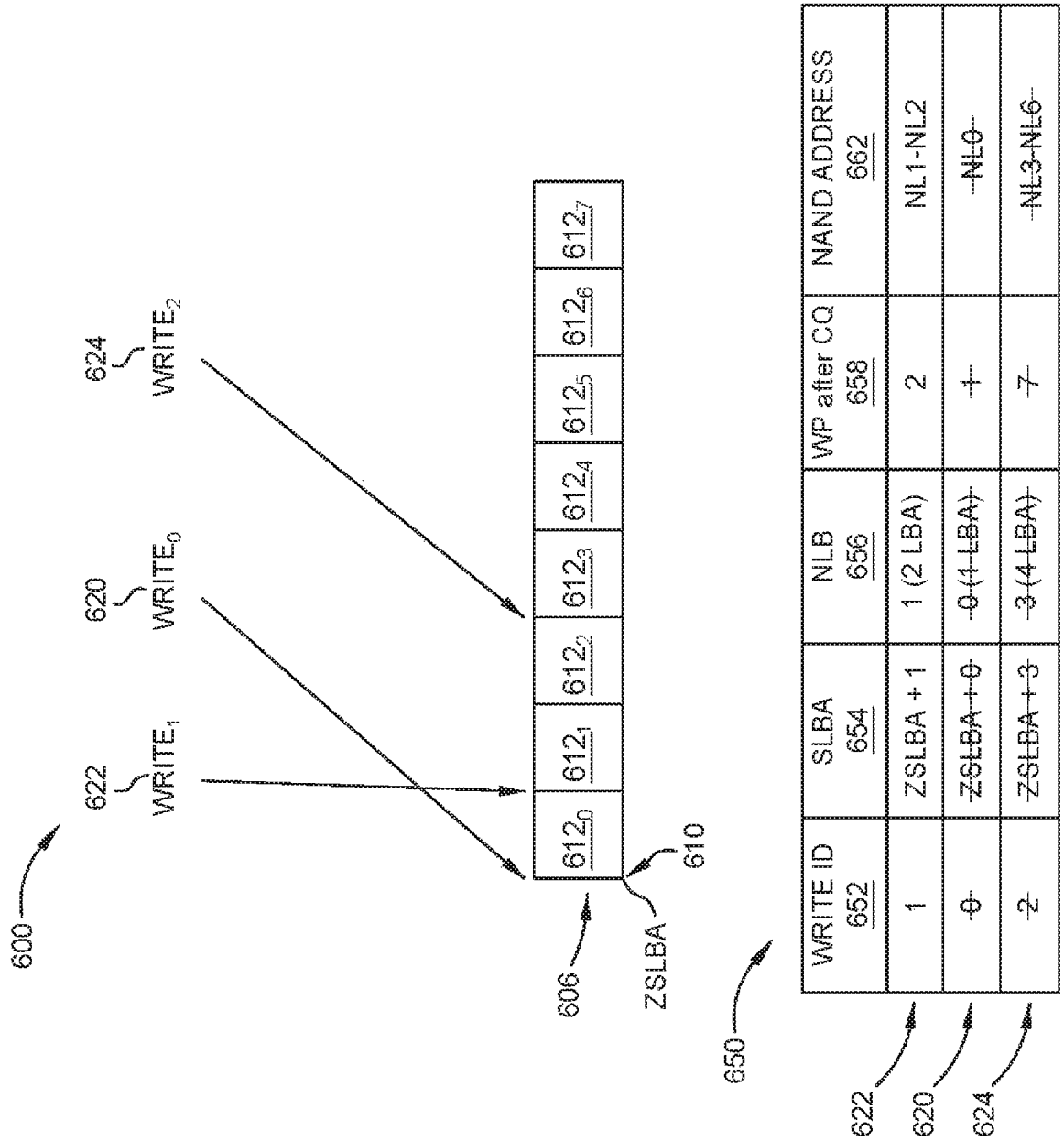

NON-SEQUENTIAL ZONED NAMESPACES

CROSS-REFERENCE TO RELATED APPLICATIONS

This application claims benefit of U.S. Provisional Patent Application Ser. No. 62/899,717, filed Sep. 12, 2019, which is herein incorporated by reference.

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The quantity of the memory device is referred to as a namespace, and the controller is configured to read data from or write data to the one or more namespaces of the memory device. Each namespace is comprised of a plurality of logical block addresses (LBAs) or sectors. The controller can access any LBA within any namespace at any time.

However, when a section of consecutive LBAs (e.g., LBAs 1-8) within a namespace are already storing data and a post-write is received to selected data of an LBA (e.g., LBA 4) within the section, the controller must read out all of the data within the section, modify the selected data, and re-write the data associated with each LBA of the section to a new location. Such a read-modify-write process may decrease the performance of both the storage device and the host, as well as decrease the endurance of the storage device and increase the host overhead.

Thus, what is needed is a new method of operating a storage device.

SUMMARY OF THE DISCLOSURE

The present disclosure generally relates to methods of operating storage devices. A controller of the storage device is configured to retrieve a first command to write data to one or more first logical blocks of a first zone, and direct memory access (DMA) read and write the data associated with the first command to the first logical blocks. The first logical blocks are between a zone starting point of the first zone and a zone capacity of the first zone. The controller is configured to retrieve a second command to write data to one or more second logical blocks of the first zone, and DMA read and write the data associated with the second command to the second logical blocks. The second logical blocks are between the zone starting and the zone capacity of the first zone, and the first logical blocks are non-sequential to the second logical blocks.

In one embodiment, a storage device comprises a media unit, wherein a capacity of the media unit is divided into a plurality of zones, each zone comprising a plurality of logical blocks, and a controller coupled to the media unit. The controller is configured to retrieve a first command to write data to a first zone and direct memory access (DMA) read data associated with the first command, identify one or more first logical blocks of the first zone to write the data associated with the first command to, wherein the one or more first logical blocks are between a zone starting logical block address of the first zone and a zone capacity of the first zone, retrieve a second command to write data to the first zone and DMA read data associated with the second command, and identify one or more second logical blocks of the first zone to write the data associated with the second command to, wherein the one or more second logical blocks are between the zone starting logical block address of the first zone and the zone capacity of the first zone, and wherein the one or more second logical blocks are spaced from the one or more first logical blocks by one or more empty logical blocks.

In another embodiment, a storage device comprises a media unit, wherein a capacity of the media unit is divided into a plurality of zones, each zone comprising a plurality of logical blocks, and a controller coupled to the media unit. The controller is configured to retrieve a first command to write data to one or more first logical blocks in a first zone, wherein the one or more first logical blocks are between a zone starting logical block address of the first zone and a zone capacity of the first zone, write the data associated with the first command to the one or more first logical blocks of the first zone and to a first location in the media unit, retrieve a second command to write data to one or more second logical blocks in the first zone, wherein the one or more second logical blocks are between the zone starting logical block address of the first zone and the zone capacity of the first zone, and wherein the one or more second logical blocks are non-sequential to the first one or more logical blocks, and write the data associated with the second command to the one or more second logical blocks of the first zone and to a second location in the media unit, the second location being located sequential to the first location.

In yet another embodiment, a storage system comprises a host device, the host device comprising a first tracking table and a storage system. The storage system comprises a media unit, wherein a capacity of the media unit is divided into a plurality of zones, each zone comprising a plurality of logical blocks, and wherein the media unit stores a second tracking table and a controller coupled to the media unit. The controller is configured to retrieve a first command to write data to one or more first logical blocks in a first zone and DMA read data associated with the first command, wherein the one or more first logical blocks are between a zone starting logical block address of the first zone and a zone capacity of the first zone, write the data associated with the first command to the one or more first logical blocks of the first zone, update the first and second tracking tables to indicate that the one or more first logical blocks are unavailable to write data associated with subsequent commands to, retrieve a second command to write data to one or more second logical blocks in the first zone and DMA read data associated with the second command, wherein the one or more second logical blocks are between the zone starting logical block address of the first zone and the zone capacity of the first zone, and wherein at least one of the one or more second logical blocks are non-sequential to the one or more first logical blocks, write the data associated with the second command to the one or more second logical blocks of the first zone; and update the first and second tracking tables to indicate that the one or more second logical blocks are unavailable to write data associated with subsequent commands to.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6A illustrates a zoned namespaces having the sequentially check turned on, according to another embodiment.

FIG. 6B illustrates a corresponding table of write commands received for the zones namespaces of FIG. 6A, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. A controller of the storage device is configured to retrieve a first command to write data to one or more first logical blocks of a first zone, and direct memory access (DMA) read and write the data associated with the first command to the first logical blocks. The first logical blocks are between a zone starting point of the first zone and a zone capacity of the first zone. The controller is configured to retrieve a second command to write data to one or more second logical blocks of the first zone, and DMA read and write the data associated with the second command to the second logical blocks. The second logical blocks are between the zone starting and the zone capacity of the first zone, and the first logical blocks are non-sequential to the second logical blocks.

Figure 1:
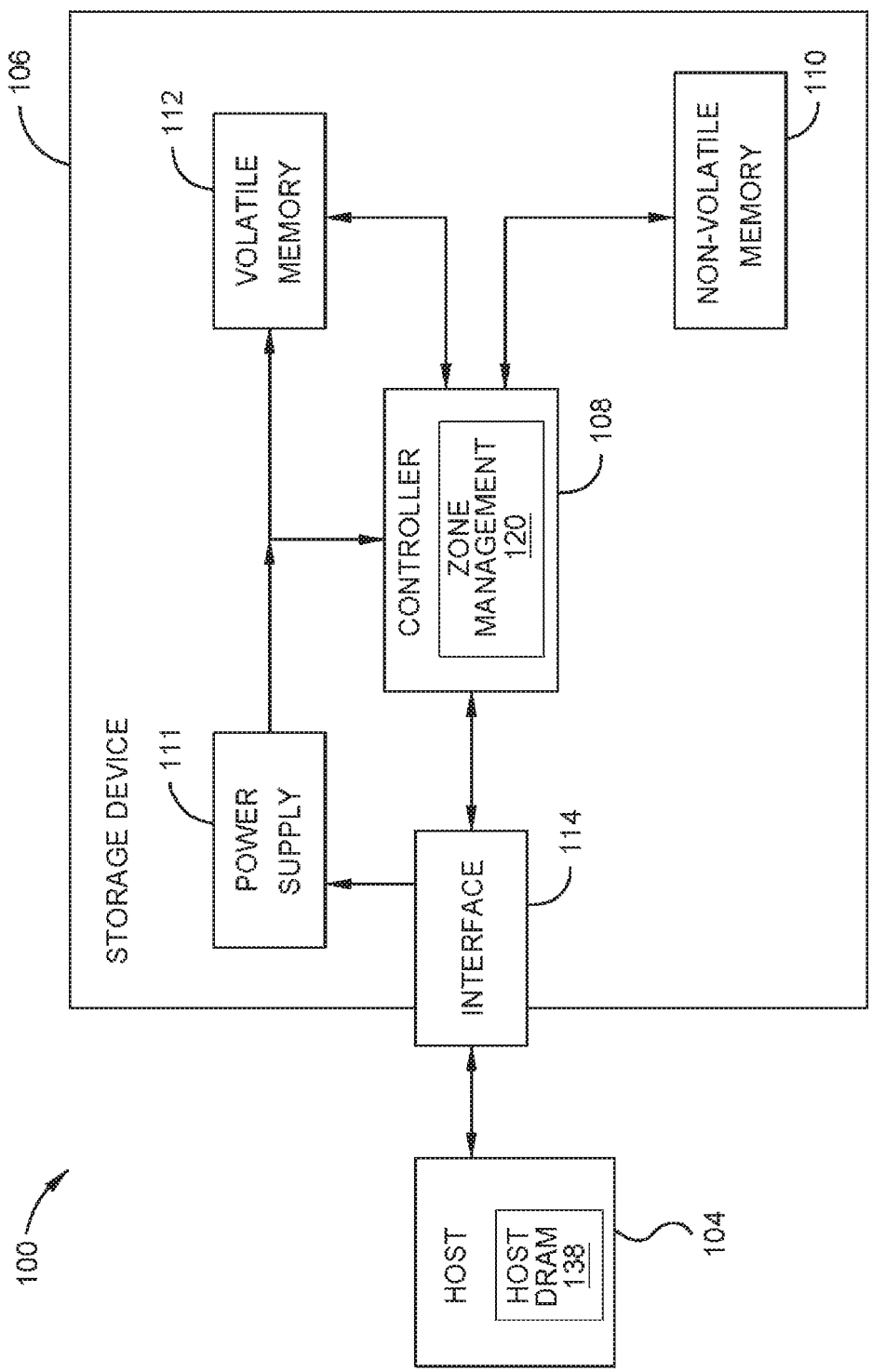
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize non-volatile memory devices 110 included in storage device 106 to store and retrieve data. The host device 104 comprises a host DRAM 138. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, and an interface 114. The controller 108 comprises a zone management 120. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), non-volatile memory express (NVMe), OpenCAPI, GenZ, Cache Coherent Interface Accelerator (CCIX), Open Channel SSD (OCSSD), Coherent Accelerator (CXL), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, hard disk drives (HDD), and any other type of non-volatile memory devices.

The NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The storage device 106 includes a controller 108, which may manage one or more operations of the storage device 106. For instance, the controller 108 may manage the reading of data from and/or the writing of data to the NVM 110. The controller 108 may comprise zone management 120 to manage read and writes to zones, as well relocation of valid data to and from zones for garbage collection purposes. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110.

Figure 2:
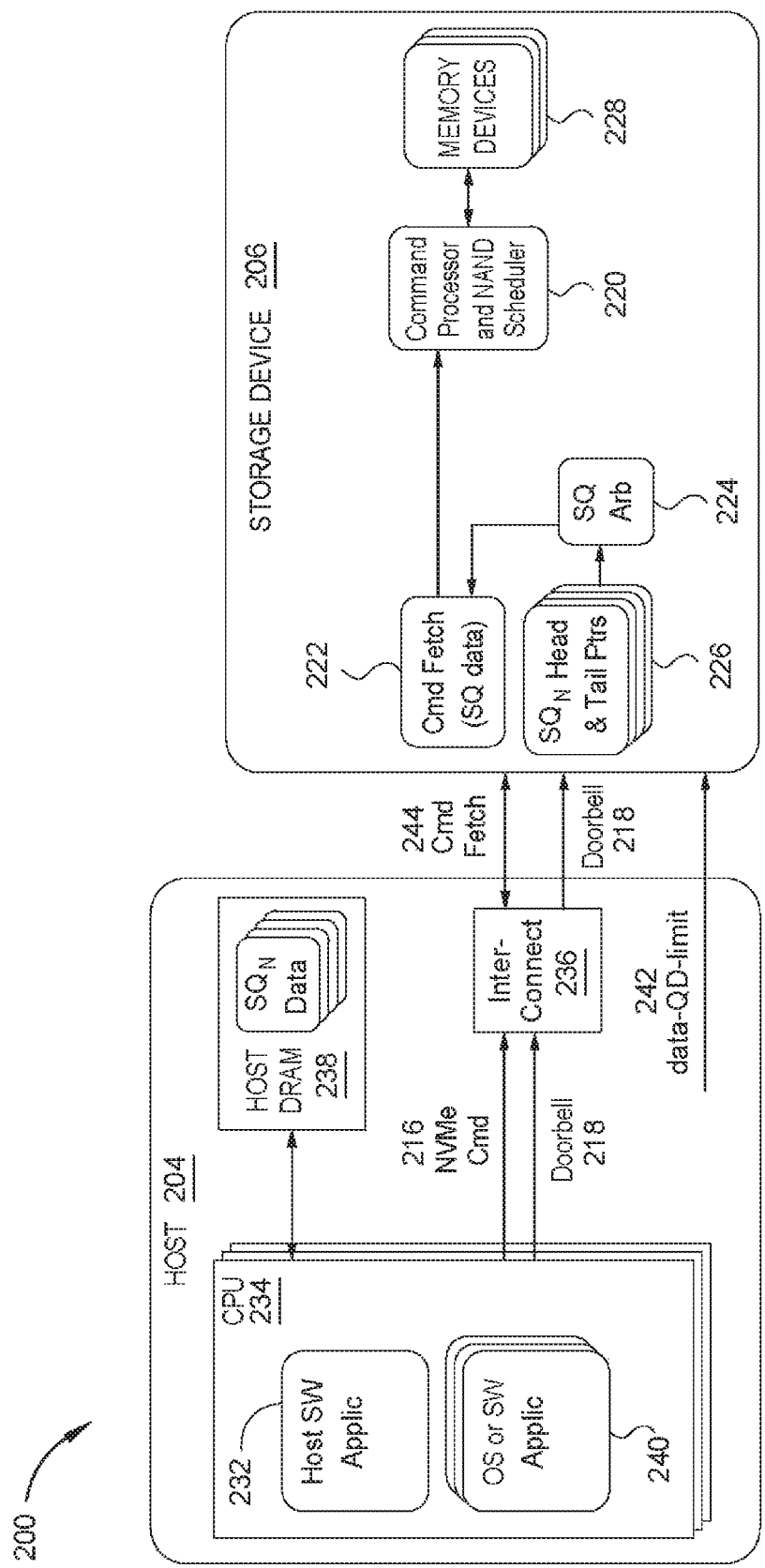
FIG. 2 illustrates a storage system comprising a storage device coupled to a host device, according to another embodiment.

FIG. 2 illustrates a storage system 200 comprising a storage device 206 coupled to a host device 204, according to another embodiment. Storage system 200 may be the storage system 100, the host device 104, and the storage device 106 of FIG. 1.

The storage device 206 may send and receive commands and data from the host device 204, and comprises a command processor 220. The command processor 220 may be the controller 108 of FIG. 1. The command processor 220 may schedule memory device access, such as NAND access, and may perform a read to a memory device prior to a previously received command requiring a write to the same memory device. The command processor 220 is coupled to one or more memory devices 228 and a command fetch 222. The one or more memory devices 228 may be NAND non-volatile memory devices. The command fetch 222 is coupled to a submission queue arbitration 224. The submission queue arbitration 224 is coupled to one or more submission queue head and tail pointers 226.

The host device 204 is comprised of one or more host software applications 232 coupled to one or more processing units or CPU applications 234. In one embodiment, the software application 232 has limited solid-state drive queue depth in order to derive a latency QoS for each user of the system 200. The host device 204 further comprises an operating system (OS) or software application 240 without an associated QoS. The CPU 234 is coupled to an interconnect 236 and to a host DRAM 238. The host DRAM 238 may store submission queue data. The interconnect 236 is coupled to the storage device 206. The interconnect 236 may be in communication with both the submission queue head and tail pointers 226 and the command fetch 222.

The CPU 234 generates one or more commands 216 to send to the storage device 206, and may send and receive commands from the storage device 206 via the command fetch signal 244. The CPU 234 may further send an interrupt or doorbell 218 to the storage device 206 to notify the storage device 206 of the one or more commands 216. The CPU 234 may limit data-queue depth submitted to the storage device 206. Queue depth (QD) is the maximum number of commands queued to the storage device 206, and data-QD is the amount of data associated with the commands queued with a QD. In one embodiment, the data-QD 242 of the storage device 206 is equal to the bandwidth of the storage device 206. Data-QD 242 is limited to the highest level under which the storage device 206 can still maintain a desired latency QoS. The command processor 220 then processes the commands received from the host device 204.

Figure 3:
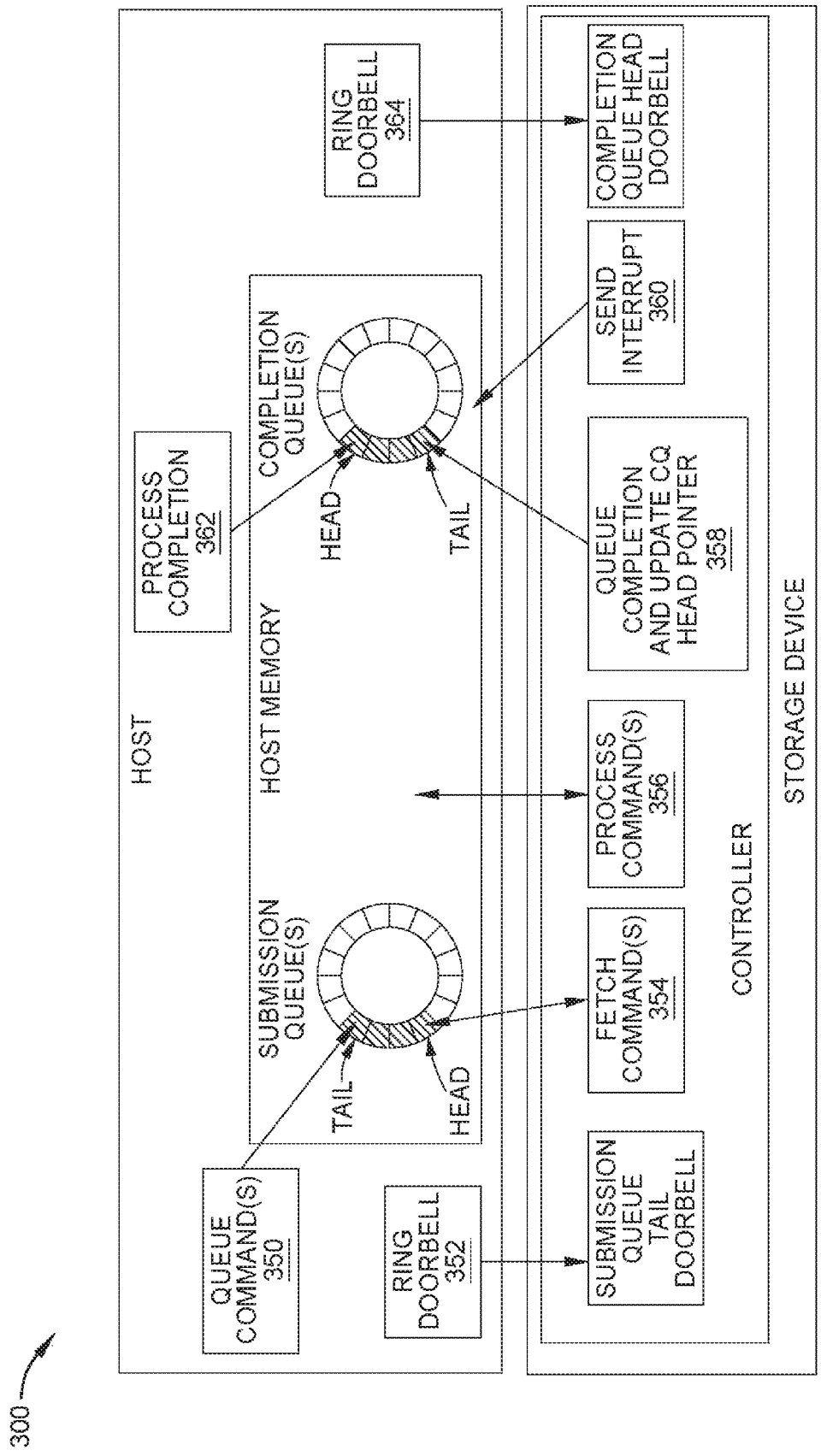
FIG. 3 is a block diagram illustrating a method of operating a storage device to execute a read or write command, according to one embodiment.

FIG. 3 is a block diagram illustrating a method 300 of operating a storage device to execute a read or write command, according to one embodiment. Method 300 may be used with the storage system 100 having a host device 104 and a storage device 106 comprising a controller 108. Method 300 may further be used with the storage system 200 having a host device 204 and a storage device 206 comprising a command processor 220.

Method 300 begins at operation 350, where the host device writes a command into a submission queue as an entry. The host device may write one or more commands into the submission queue at operation 350. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 352, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 354, in response to receiving the doorbell or interrupt signal, a controller of the storage device fetches the command from the one or more submission queue, and the controller receives or DMA reads the command.

In operation 356, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more LBA of the zone, and advancing a write pointer of the zone to identify the next available LBA within the zone.

In operation 358, once the command has been fully processed, the controller writes a completion entry corresponding to the executed command to a completion queue of the host device and moves or updates the CQ head pointer to point to the newly written completion entry.

In operation 360, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 362, the host device processes the completion entry. In operation 364, the host device writes an updated CQ head pointer to the storage device and rings the doorbell or sends an interrupt signal to the storage device to release the completion entry.

Figure 4A:
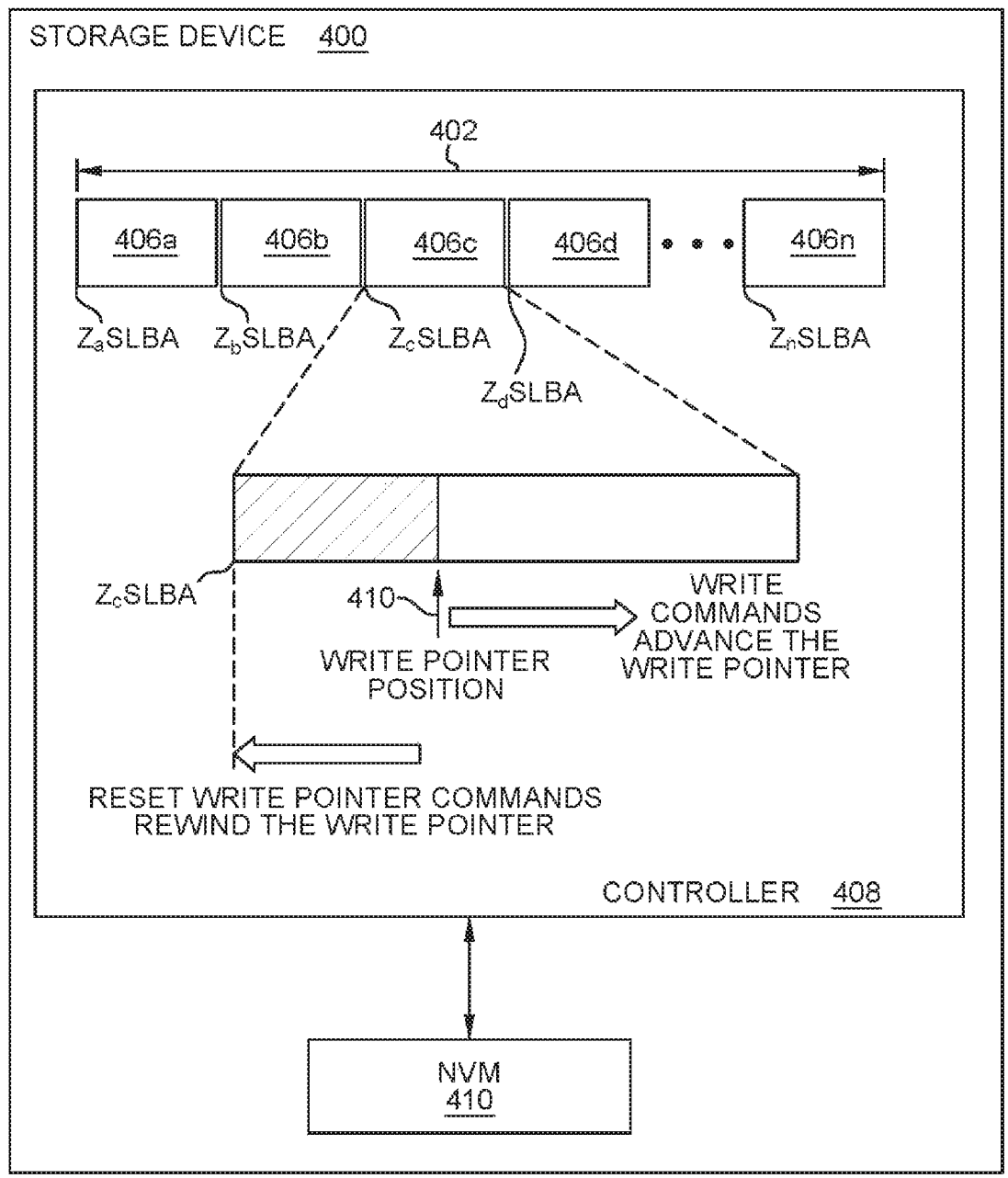
FIG. 4A illustrates a zoned namespaces utilized in a storage device, according to one embodiment.
Figure 4B:
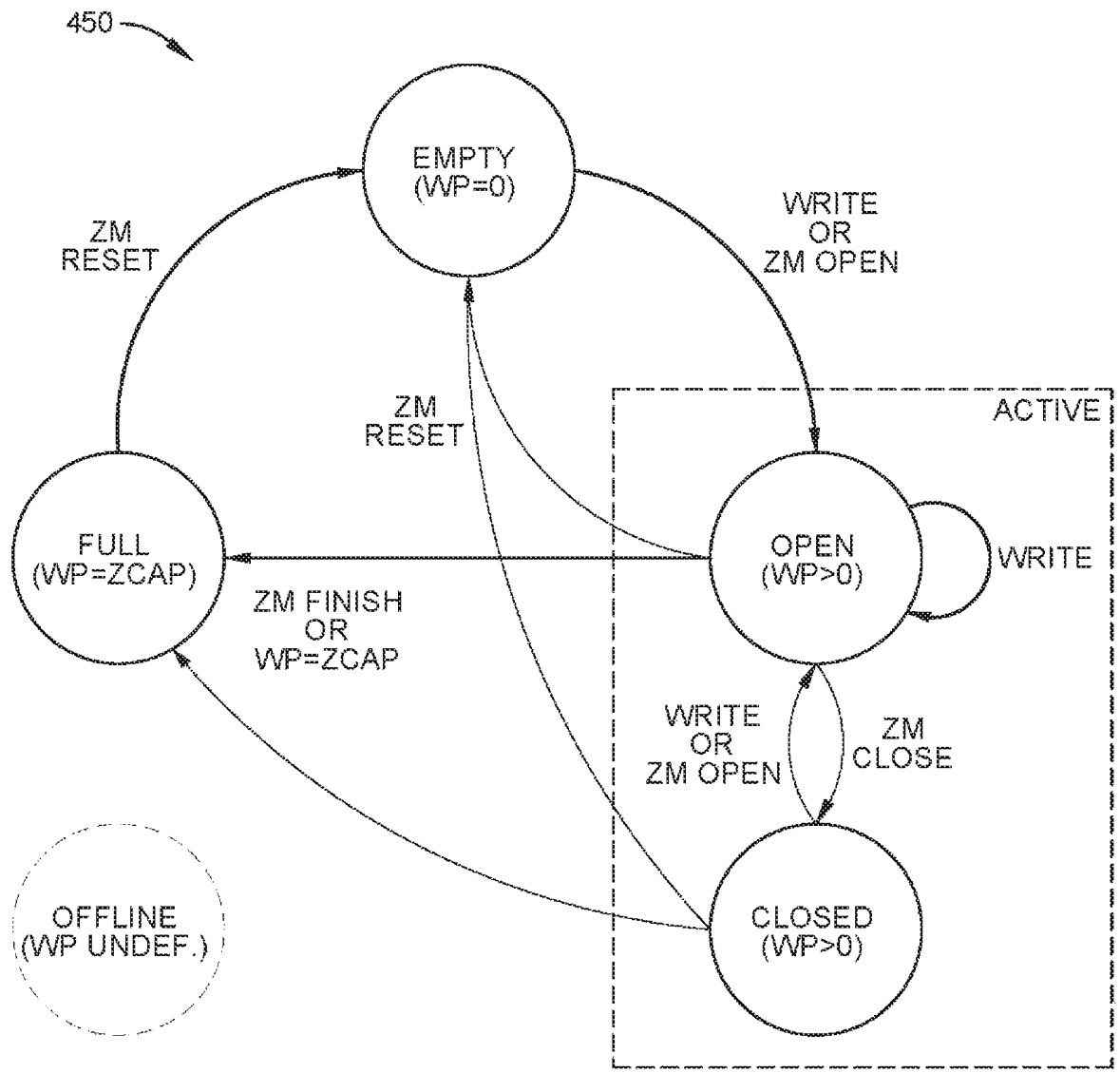
FIG. 4B illustrates a state diagram for the zoned namespaces of the storage device of FIG. 4A, according to one embodiment.

FIG. 4A illustrates a Zoned Namespaces (ZNS) 402 view utilized in a storage device 400, according to one embodiment. The storage device 400 may present the ZNS 402 view to a host device. FIG. 4B illustrates a state diagram 450 for the ZNS 402 of the storage device 400, according to one embodiment. The storage device 400 may be the storage device 106 of the storage system 100 of FIG. 1 or the storage device 206 of the storage system 200 of FIG. 2. The storage device 400 may have one or more ZNS 402, and each ZNS 402 may be different sizes. The storage device 400 may further comprise one or more conventional namespaces in addition to the one or more Zoned Namespaces 402. Moreover, the ZNS 402 may be a zoned block command (ZBC) for SAS and/or a zoned-device ATA command set (ZAC) for SATA.

In the storage device 400, the ZNS 402 is the quantity of NVM that can be formatted into logical blocks such that the capacity is divided into a plurality of zones 406a-406n (collectively referred to as zones 406). Each of the zones 406 comprise a plurality of physical or erase blocks (now shown) of a media unit or NVM 404, and each of the erase blocks are associated a plurality of logical blocks (not shown). When the controller 408 receives a command, such as from a host device (not shown) or the submission queue of a host device, the controller 408 can read data from and write data to the plurality of logical blocks associated with the plurality of erase blocks of the ZNS 402. Each of the logical blocks is associated with a unique LBA or sector.

In one embodiment, the NVM 404 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 kB for two pages of an MCL NAND results in about 16 NAND locations per wordline. However, the NAND location size is not intended to be limiting, and is merely used as an example.

When data is written to an erase block, one or more logical blocks are correspondingly updated within a zone 406 to track where the data is located within the NVM 404. Data may be written to one zone 406 at a time until a zone 406 is full, or to multiple zones 406 such that multiple zones 406 may be partially full. Similarly, when writing data to a particular zone 406, data may be written to the plurality of erase blocks one block at a time, in sequential order of NAND locations or wordline-by-wordline, until moving to an adjacent block (i.e., write to a first erase block until the first erase block is full before moving to the second erase block), or to multiple blocks at once, in sequential order of NAND locations or wordline-by-wordline, to partially fill each block in a more parallel fashion (i.e., writing the first NAND location of each erase block before writing to the second NAND location of each erase block).

When a controller 408 selects the erase blocks that will store the data for each zone, the controller 408 will be able to choose the erase blocks either at the zone open time, or the controller 408 may choose the erase blocks as a need to fill the first NAND location or wordline of that particular erase block is reached. This may be more differentiating when the above described method of filling one erase block completely prior to starting the next erase block is utilized. The controller 408 may use the time difference to select a more optimal erase block in a just-in-time basis. The decision of which erase block is allocated and assigned for each zone and its contiguous LBAs can be occurring for zero or more concurrent zones at all times within the controller 408.

Each of the zones 406 is associated with a zone starting logical block address (ZSLBA) or zone starting sector. The ZSLBA is the first available LBA in the zone 406. For example, the first zone 406a is associated with $Z_a$SLBA, the second zone 406b is associated with $Z_b$SLBA, the third zone 406c is associated with $Z_c$SLBA, the fourth zone 406d is associated with $Z_d$SLBA, and the $n^{th}$ zone 406n (i.e., the last zone) is associated with $Z_n$SLBA. Each zone 406 is identified by its ZSLBA, and is configured to receive sequential writes (i.e., writing data to the NVM 110 in the order the write commands are received).

As data is written to a zone 406, a write pointer 410 is advanced or updated to point to or to indicate the next available block in the zone 406 to write data to in order to track the next write starting point (i.e., the completion point of the prior write equals the starting point of a subsequent write). Thus, the write pointer 410 indicates where the subsequent write to the zone 406 will begin. Subsequent write commands are 'zone append' commands, where the data associated with the subsequent write command appends to the zone 406 at the location the write pointer 410 is indicating as the next starting point. An ordered list of LBAs within the zone 406 may be stored for write ordering. Each zone 406 may have its own write pointer 410. Thus, when a write command is received, a zone 406 is identified by its ZSLBA, and the write pointer 410 determines where the write of the data begins within the identified zone 406.

FIG. 4B illustrates a state diagram 450 for the ZNS 402 of FIG. 4A. In the state diagram 450, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if a zone open command is issued by the host. Zone management (ZM) commands can be used to move a zone between zone open and zone closed states, which are both active states. If a zone is active, the zone comprises open blocks that may be written to, and the host may be provided a description of recommended time in the active state by the ZM or the controller 408. The controller may comprise the ZM.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 400 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 408 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available blocks to write data to (i.e., WP=zone capacity (ZCAP)). Read commands of data stored in full zones may still be executed.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 400. The storage device 400 may mark one or more erase blocks for erasure. When a new zone is going to be formed and the storage device 400 anticipates a ZM open, the one or more erase blocks marked for erasure may then be erased. The storage device 400 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 410 for the zone 406 may be selected, enabling the zone 406 to be tolerant to receive commands out of sequential order. The write pointer 410 may optionally be turned off such that a command may be written to whatever starting LBA is indicated for the command.

Referring back to FIG. 4A, when the controller 408 receives a write command from the host 204 or direct memory access (DMA) reads the write data, the controller 408 may select an empty erase block to write the data associated with the command to, and the empty zone 406 switches to an active and open zone 406. The write command may be a command to write new data, or a command to move valid data to another zone for garbage collection purposes. The controller 408 is configured to DMA read or pull-in new commands from a submission queue populated by a host device.

In an empty zone 406 just switched to an active zone 406, the data is assigned to the zone 406 and the associated set of sequential LBAs of the zone 406 starting at the ZSLBA, as the write pointer 410 is indicating the logical block associated with the ZSLBA as the first available logical block. The data may be written to one or more erase blocks or NAND locations that have been allocated for the physical location of the zone 406. After the data associated with the write command has been written to the zone 406, the write pointer 410 is updated to point to the next LBA available for a host write (i.e., the completion point of the first write). The write data from such a host write command is programmed sequentially into the next available NAND location in the erase block selected for physical backing of the zone.

In some embodiments, a NAND location may be equal to a wordline. In such an embodiment, if the write command is smaller than a wordline, the controller may optionally aggregate several write commands in another memory location such as DRAM or SRAM prior to programming a full wordline composed of multiple write commands. Write commands that are longer than a wordline will be able to program and fill a complete wordline with some of the data, and the excess data beyond a wordline will be used to fill the next wordline. For the purposes of this description, the write data sizes are equal to a NAND location of 512 bytes; however, the size of a NAND location is not intended to be limiting.

For example, the controller 408 may receive a first write command to a third zone 406c, or a first zone append command. The host identifies sequentially which logical block of the zone 406 to write the data associated with the first command to. The data associated with the first command is then written to the first or next available LBA(s) in the third zone 406c as indicated by the write pointer 410, and the write pointer 410 is advanced or updated to point to the next available LBA available for a host write (i.e., WP>0). If the controller 408 receives a second write command to the third zone 406c, or a second zone append command, the data associated with the second write command is written to the next available LBA(s) in the third zone 406c identified by the write pointer 410. Once the data associated with the second command is written to the third zone 406c, the write pointer 410 once again advances or updates to point to the next available LBA available for a host write. Resetting the zone 406c moves the write pointer 410 back to the $Z_c$SLBA (i.e., WP=0), and the zone 406c switches to an empty zone.

However, a strict write ordering may cause the host writes to degenerate to single write I/O per zone 406, which limits the host performance and increases the host overhead. As such, the storage device 400 is configured to receive a manufacture or vendor specific command to turn off the sequentially check.

Figures 5A, 5B:
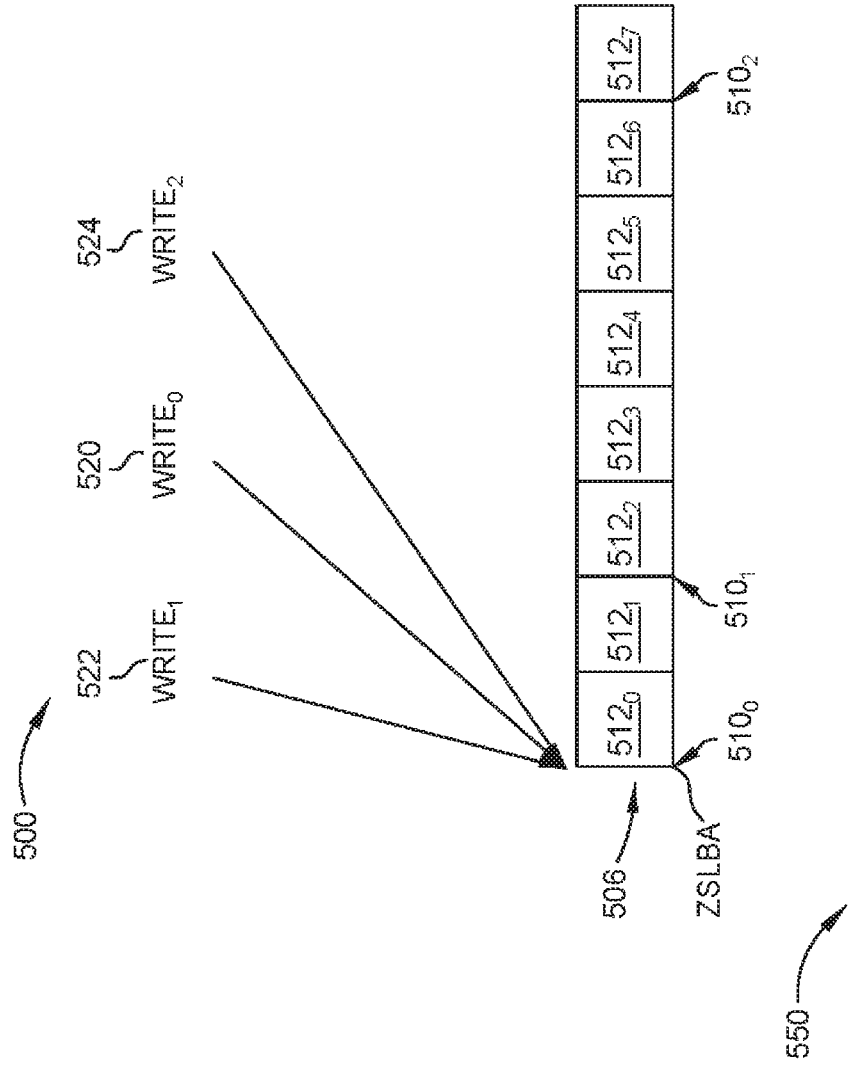
FIG. 5A illustrates a zoned namespaces having the sequentially check turned off, according to one embodiment.
FIG. 5B illustrates a corresponding table of write commands received for the zoned namespaces of FIG. 5A, according to one embodiment.

FIG. 5A illustrates a ZNS 500 having the sequentially check turned off while receiving zone append commands, according to one embodiment. FIG. 5B illustrates a corresponding table 550 of write commands retrieved for the ZNS 500. The table 550 may be stored in the controller or in a memory device of the storage device. The ZNS 500 may be the ZNS 402 of FIG. 4. While the ZNS 500 of FIG. 5A is shown comprising one zone 506, the ZNS 500 may comprise a plurality of zones 506. Moreover, each zone 506 of the plurality of zones of the ZNS 500 may have its own individual table 550, or one table 550 may track all of the write commands retrieved by each zone 506 of the plurality of zones. FIG. 6A illustrates a ZNS 600 having the sequentially check turned on while receiving zone append commands, according to another embodiment. FIG. 6B illustrates a corresponding table 650 of write commands retrieved for the ZNS 600. The ZNS 600 may be the ZNS 402 of FIG. 4.

In FIG. 5A, a first write command (write$_0$) 520, a second write command 522 (write$_1$), and a third write command 524 (write$_2$) are received or DMA read and a zone 506 is identified by its ZSLBA to store the data associated with each of the first, second, and third write commands 520, 522, 524. The write commands 520, 522, 524 may each be a command to write new data, or a command to move valid data from one zone to another zone for garbage collection purposes. A controller, such as the controller 408 of FIG. 4A, is configured to retrieve new commands from a host device and DMA read the data associated with the new commands. Sequentially, the first write command 520 is intended to be written first, the second write command 522 is intended to be written second, and the third write command 524 is intended to be written third. The zone 506 comprises a plurality of logical blocks $512_0$-$512_7$ (collectively referred to as logical blocks 512). Each of the logical blocks corresponds to an LBA, which is shown in the table 550. While eight logical blocks 512 are shown, the zone 506 may comprise any number of logical blocks 512.

FIG. 5B illustrates a corresponding table 550 that tracks the write commands retrieved by the zone 506. The table 550 comprises a first column 552 identifying a write ID of the commands (i.e., the sequential order of the commands), a second column 554 identifying the starting LBA, a third column 556 identifying the number of logical blocks needed to write the data associated with a command and the anticipated starting LBA, a fourth column 558 identifying the number of logical blocks the write pointer 510 has advanced after a write has been logged in the completion queue, a fifth column 560 identifying the LBA offset of the zone from the ZSLBA, and a sixth column 562 identifying the physical location of the NAND address associated with the LBA used to store the data. While three write pointers $510_0$, $510_1$, $510_2$ are shown, the zone 506 comprises only one write pointer 510, and the three write pointers $510_0$, $510_1$, $510_2$ indicate the position of the single write pointer 510 as data is written to the zone 506 at different times as described below.

Each write command 520, 522, 524 is displayed in the table 550 in the submission order, rather than the sequential order. In the table 550, the second write command 522, identified by write ID 1, is received before the first write command 520, identified by write ID 0. The second column 554 identifies the starting LBA for the second write command 522 as the ZSLBA, and requires two logical blocks (2 LBA) to store the data, as identified in the third column 556. Since the first write command 520 is supposed to be the first sequential write to the zone 506 and requires only one logical block (1 LBA), the third column 556 further identifies the anticipated starting LBA for the second command 522 as the second logical block $512_1$ of the zone 506.

However, since the second command 522 was submitted prior to the first command 520, the second command 522 starts at the first available logical block $512_0$ of the zone 506 indicated by the write pointer $510_0$. Since the table 550 merely indicates the starting LBA as the ZSLBA, the data associated with the second command 522 is written to the first available logical block $512_0$ indicated by the write pointer $510_0$. Upon writing the data associated with the second command 522 to the first logical block $512_0$ and the second logical block $512_1$ of the zone 506, the write pointer 510 is advanced two logical blocks, and the fourth column 558 is correspondingly updated. As shown in the sixth column 562 of the table 550, the data associated with the second command 522 is stored in first and second NAND locations NL0, NL1, as the first logical block $512_0$ and the second logical block $512_1$ correspond to the first NAND location NL0 and the second NAND location NL1, respectively.

The controller of the storage device then determines the LBA offset from the ZSLBA, and the completion entry is returned to the completion queue as the last LBA written to the zone 506. The advancement of the write pointer 510, the determination of the offset, and the return of the completion entry to the completion queue may occur simultaneously or in any order. The fifth column 560 is then updated to identify that after the data associated with the second command 522 is written to the zone 506, the LBAs are offset from the ZSLBA by two (ZSLBA+2). Returning the completion entry to the completion queue and updating the fifth column 560 inform the host device where the data associated with the second command is stored.

The first write command 520 was submitted after the second write command 522. As such, the second column 554 for the first command (write ID 0) identifies the starting LBA for the first write command 520 as the ZSLBA, and requires one logical block (1 LBA), as identified in the third column 556. While the data associated with the first write command 520 was supposed to be written to the first logical block $512_0$, as identified in the third column 556, the data associated with the second write command 522 has already been written to the first logical block $512_0$, as identified in the fifth column 560 for the second command (write ID 1).

Since the controller tracks the LBA offset in the fifth column 560 and correspondingly advances the write pointer 510, the controller acknowledges that the first logical block $512_0$ is used, and writes the data associated with the first command 520 to the next available logical block $512_2$, as indicated by the write pointer $510_1$. Upon writing the data associated with the first command 520 to the third logical block $512_2$ of the zone 506, the write pointer 510 is advanced one logical block, and the fourth column 558 is correspondingly updated. As shown in the sixth column 562 of the table 550, the data associated with the first command 520 is stored in a third NAND location NL2, as the third logical block $512_2$ corresponds to the third NAND location NL2.

The controller of the storage device then determines the LBA offset from the ZSLBA, and the completion entry is returned to the completion queue as the last LBA written to the zone 506. The advancement of the write pointer 510, the determination of the offset, and the return of the completion entry to the completion queue may occur simultaneously or in any order. The fifth column 560 is then updated to identify that after the data associated with the first and second commands 520, 522 are written to the zone 506, the LBAs are now offset from the ZSLBA by three (ZSLBA+3). Returning the completion entry to the completion queue and updating the fifth column 560 inform the host device where the data associated with the first command is stored.

The third command 524 was submitted third. For the third command 524 (write ID 2), the table 550 identifies the starting LBA as the ZSLBA in the second column 554, and identifies in the third column 556 that four logical blocks (4 LBA) are required. The controller writes the data associated with the third command 524 to the next available logical block $512_3$, as indicated by the write pointer $510_1$. Upon writing the data associated with the third command 524 to the fourth logical block $512_3$ through the seventh logical block $512_6$, the write pointer $510_2$ is advanced four logical blocks, and the fourth column 558 is correspondingly updated. As shown in the sixth column 562 of the table 550, the data associated with the third command 524 is stored in fourth through seventh NAND locations NL3-NL6, as the fourth through seventh logical blocks $512_3$-$512_6$ correspond to the fourth through seventh NAND locations NL3-NL6, respectively.

The controller of the storage device then determines the LBA offset from the ZSLBA, and the completion entry is returned to the completion queue as the last LBA written to the zone 506. The advancement of the write pointer 510, the determination of the offset, and the return of the completion entry to the completion queue may occur simultaneously or in any order. The fifth column 560 is then updated to identify that after the data associated with the first, second, and third commands 520, 522, 524 are written to the zone 506, the LBAs are now offset from the ZSLBA by seven (ZSLBA+7). Returning the completion entry to the completion queue and updating the fifth column 560 inform the host device where the data associated with the third command is stored.

Alternatively, FIGS. 6A-6B illustrates a ZNS 600 having the sequentially check turned on, and a corresponding table 650 of write commands retrieved for the ZNS 600. While the ZNS 600 of FIG. 6A is shown comprising one zone 606, the ZNS 600 may comprise a plurality of zones 606. Moreover, each zone 606 of the plurality of zones of the ZNS 600 may have its own individual table 650, or one table 650 may track all of the write commands retrieved by each zone 606 of the plurality of zones.

In FIG. 6A, a first write command (write$_0$) 620, a second write command 622 (write$_1$), and a third write command 624 (write$_2$) are retrieved or DMA read, and a zone 606 is identified by its ZSLBA to store the data associated with each of the first, second, and third write commands 620, 622, 624. A controller, such as the controller 408 of FIG. 4A, is configured to DMA read new commands from a host device. Sequentially, the first write command 620 is intended to be written first, the second write command 622 is intended to be written second, and the third write command 624 is intended to be written third. The zone 606 comprises a plurality of logical blocks $612_0$-$612_7$ (collectively referred to as logical blocks 612). Each of the logical blocks corresponds to an LBA, which is shown in the table 650. While eight logical blocks 612 are shown, the zone 606 may comprise any number of logical blocks 612.

FIG. 6B illustrates a corresponding table 650 that tracks the write commands received to the zone 606. The table 650 comprises a first column 652 identifying a write ID of the commands, a second column 654 identifying the starting LBA, a third column 656 identifying the number of logical blocks needed to write the data associated with a command and the starting LBA, a fourth column 658 identifying the number of logical blocks the write pointer 610 has advanced after a write has been logged in the completion queue, and a fifth column 662 identifying the physical location of the NAND address associated with the LBA used to store the data.

Each write command 620, 622, 624 is displayed in the table 650 in the submission order, rather than the sequential order. In the table 650, the second write command 622, identified by write ID 1, is received before the first write command 620, identified by write ID 0. The second column 654 identifies the starting LBA for the second write command 622 as the second logical block after the ZSLBA (ZSLBA+1) (i.e., the second LBA $612_1$), and requires two logical blocks (2 LBA) to store the data, as identified in the third column 656. Since the first write command 620 is supposed to be the first sequential write to the zone 606 and requires only one logical block (1 LBA) to store the data, the third column 656 further identifies the starting LBA for the second command 622 as the second LBA $612_1$ of the zone 606.

Since the second command 622 was submitted prior to the first command 620, the controller attempts to write the data associated with the second command 622 prior to the data associated with the first command 620. However, the write pointer 610 indicates the first logical block $612_0$ associated with the first logical block address as the first available logical block, but the table 650 conflictingly indicates the second logical block $612_1$ as the starting logical block for the second command 622. Since the write pointer 610 and the table 650 indicate different starting LBAs for the second command 622, the data associated with the second command 622 cannot be written to the zone 606.

FIGS. 7A-7F illustrate writing to a zone 706 of a ZNS 700 non-sequentially and without receiving zone append commands, according to one embodiment. The ZNS 700 may be utilized with the storage device 400 and NVM 404 of FIG. 4. The ZNS 700 may be the ZNS 402 of FIG. 4. While only one zone 706 is shown in the ZNS 700, the ZNS 700 may comprise a plurality of zones, and the similar out of order write activity described below may be occurring in one or more of the plurality of zones. FIG. 8 illustrates an exemplary corresponding table 800 that tracks the write commands retrieved by the zone 706. Each zone 706 of the plurality of zones of the ZNS 700 may have its own individual table 800, or one table 800 may track all of the write commands retrieved by each zone 706 of the plurality of zones. The table 800 may be stored in the controller, in a memory device of the storage device, and/or in the host device. In one embodiment, both the storage device and the host device individually store the table 800.

As described above, exemplary NAND locations are equal to a granularity of 512 bytes. Thus, an LBA size of 512 bytes and a page size of 16 kB for two pages of an MCL NAND results in about 16 NAND locations per wordline. However, the NAND location size is not intended to be limiting, and is merely used as an example. Additionally, while NAND is used as an example, other types of memory may be used as well, and NAND is not intended to be limiting.

Figure 7A:
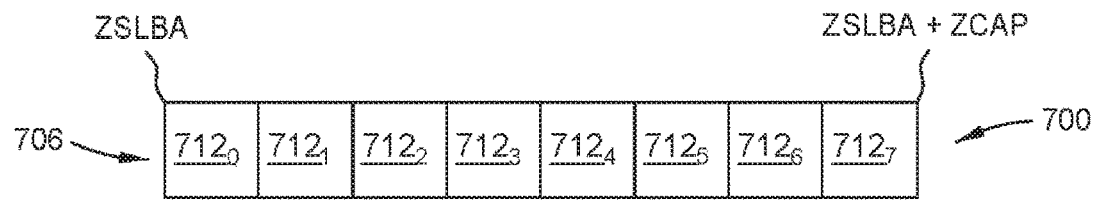
FIGS. 7A-7F illustrate writing to a zone of a ZNS non-sequentially and without receiving zone append commands, according to one embodiment.
Figure 8:
FIG. 8 illustrates a corresponding table that tracks the write commands retrieved by the zone of FIGS. 7A-7F.

FIG. 7A illustrates the zone 706 being empty and storing no data (i.e., no command has been retrieved to write data to the zone 706 yet). The zone 706 may be in the empty or active state. The zone 706 comprises a plurality of logical blocks $712_0$-$712_7$ (collectively referred to as logical blocks 712). Each of the logical blocks 712 corresponds to an LBA or sector, which are tracked in a corresponding table 800 of FIG. 8. While eight logical blocks 712 are shown, the zone 706 may comprise any number of logical blocks 712. A ZSLBA indicates the starting or first LBA of the zone 706 while a ZSLBA+ZCAP indicates the ending or full capacity of the zone 706 (i.e., zone capacity).

A controller, such as the controller 408 of FIG. 4A, is configured to retrieve new commands to a zone 706 from a host device and DMA read the data associated with the new commands. The controller may then write the data associated with the command to one or more logical blocks 712 of the zone 706. The zone 706 does not utilize a write pointer, as a write pointer is used to identify the next sequentially available logical block 712. Moreover, the sequentially check is turned off, like described in FIGS. 5A-5B above. However, the controller may still implement an optional safety feature to determine whether a particular LBA has already been written to during the current duration of the zone active state. If a particular LBA has already been written to during the current duration of the zone active state, the controller may optionally reject the second write to the LBA.

FIG. 8 illustrates a corresponding table 800 that tracks the write commands received by the zone 706. The table 800 may be stored in DRAM. The table 800 comprises a first column 852 identifying a write ID of the commands (i.e., the sequential order of the commands), a second column 854 identifying the starting LBA, a third column 856 identifying the number of logical blocks needed to write the data associated with a command and the anticipated starting LBA, a fourth column 860 identifying the LBA used to store the data associated with a command as unavailable to be written to (i.e., full), and a fifth column 862 identifying the physical location of the NAND address associated with the LBA used to store the data.

Figure 7B:
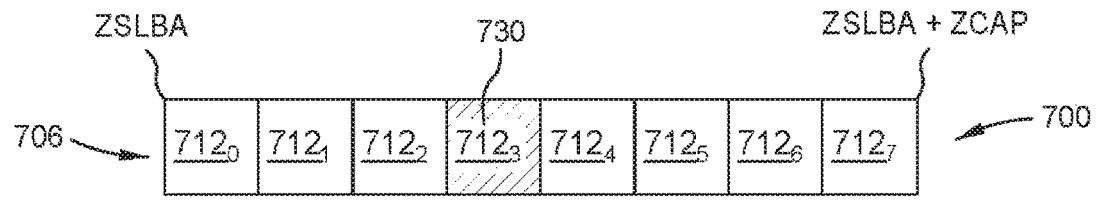

FIG. 7B illustrates the zone 706 after a first command 730 to the zone 706 has been retrieved from the host device and the data associated with the first command 730 has been written to the fourth logical block $712_3$ of the zone 706. The host identifies which logical block 712 of the zone 706 to write the data associated with the first command 730 to. The host device may select any available logical block(s) 712 of the zone 706 between the ZSLBA and the ZSLBA+ZCAP, and the selection need not be sequential. Since the host device specifically identifies one or more logical blocks 712 of the zone 706 to store the data, a write pointer need not be utilized.

The controller then retrieves the first command 730, DMA reads the data associated with the first command 730, and writes the data to the selected logical block 712 (i.e., the fourth logical block $712_3$) identified by the host device. While the data associated with the first command 730 is programmed to the fourth logical block $712_3$, the NAND address associated with the fourth logical block $712_3$ may be the first available NAND location in NAND or NVM of the storage device (i.e., the corresponding LBA pointer points to the first available NL in the NAND). For example, the NAND address of the data of the first command 730 may be a first NAND location NL0. With conventional zone append commands, the fourth logical block $712_3$ corresponds to a fourth NL in the NAND (e.g., a fourth NAND location NL3). Thus, the NAND or NVM is sequentially programmed even if the LBAs of the zone 706 are not. The table 800 of FIG. 8 is then updated and a completion entry is returned to the completion queue of the host device to notify the host device that the data associated with the first command 730 has been stored in the selected logical block $712_3$ identified by the host device.

Both the host device and the storage device may individually track which logical blocks 712 of the zone 706 have been used to store data. Once a logical block 712 has been written to, both the host device and the storage device track that the written logical block(s) 712 is unable or unavailable to be used to store more data until the zone 706 is once again returned to an empty state.

Figure 7C:
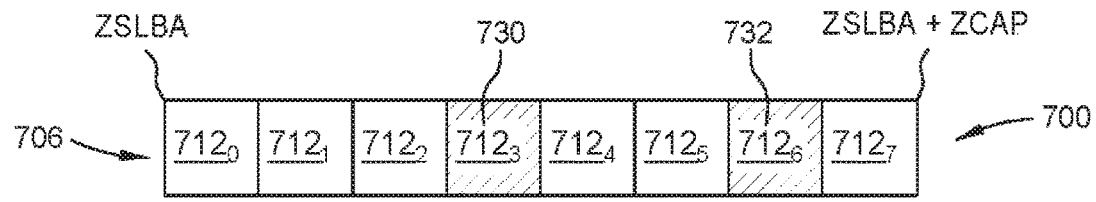

FIG. 7C illustrates the zone 706 after a second command 732 to the zone 706 has been retrieved from the host device and the data associated with the second command 732 has been written to the seventh logical block $712_6$ of the zone 706. The host again identifies which logical block 712 of the zone 706 to write the data associated with the second command 732 to. The host device may select any available logical block(s) 712 of the zone 706 between the ZSLBA and the ZSLBA+ZCAP except the fourth logical block $712_3$, which is already storing the state associated with the first command 730. The selection of a logical block 712 by the host device need not be sequential. For example, the data associated with the first command 730 is stored in the fourth logical block $712_3$ while the data associated with the second command 732 will be stored in the seventh logical block $712_6$.

The controller then retrieves the second command 732, DMA reads the data associated with the second command 732, and writes the data to the selected logical block 712 (i.e., the seventh logical block $712_6$) identified by the host device. While the data associated with the second command 732 is programmed to the seventh logical block $712_6$, the NAND address associated with the seventh logical block $712_6$ may be the next available NL in the NAND or NVM of the storage device (i.e., the corresponding LBA pointer points to the next available NL in the NAND). For example, the NAND address of the data of the second command 732 may be a second NAND location NL1. With conventional zone append commands, the seventh logical block $712_6$ corresponds to a seventh NL in the NAND (e.g., a seventh NL6). Thus, the NAND or NVM is sequentially programmed even if the LBAs of the zone 706 are not. The table 800 of FIG. 8 is then updated and a completion entry is returned to the completion queue of the host device to notify the host device that the data associated with the second command 732 has been stored in the selected logical block $712_6$ identified by the host device.

Figure 7D:
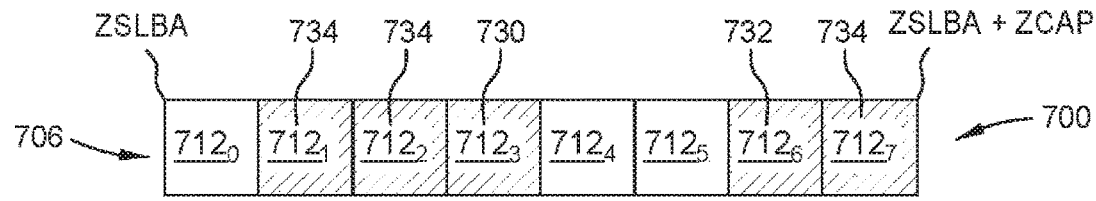

FIG. 7D illustrates the zone 706 after a third command 734 to the zone 706 has been retrieved from the host device and the data associated with the third command 734 has been written to the second logical block $712_1$, the third logical block $712_2$, and the eight logical block $712_7$ of the zone 706. The host again identifies which logical blocks 712 of the zone 706 to write the data associated with the third command 734 to, which requires more than one logical block 712. The host device may select any available logical blocks 712 of the zone 706 between the ZSLBA and the ZSLBA+ZCAP except the fourth logical block $712_3$ and the seventh logical block $712_6$, which are already storing the state associated with the first and second commands 730, 732, respectively. The selection of logical blocks 712 by the host device need not be sequential. For example, the data associated with the third command 734 will be stored in the second, third, and eighth logical blocks $712_1$, $712_2$, $712_7$.

The controller then retrieves the third command 734, DMA reads the data associated with the third command 734, and writes the data to the selected logical blocks 712 (i.e., the second, third, and eighth logical blocks $712_1$, $712_2$, $712_7$) identified by the host device. While the data associated with the third command 734 is programmed to the second, third, and eighth logical blocks $712_1$, $712_2$, $712_7$, the NAND address associated with the second, third, and eighth logical blocks $712_1$, $712_2$, $712_7$ may be the next available NLs in the NAND or NVM of the storage device (i.e., the corresponding LBA pointer points to the next available NLs in the NAND). For example, the NAND address of the data of the third command 734 may be the third, fourth, and fifth NAND locations NL2, NL3, NL4. With conventional zone append commands, the second, third, and eighth logical blocks $712_1$, $712_2$, $712_7$ corresponds to the second, third, and eighth NLs, respectively, in the NAND (e.g., the second, third, and eighth NAND locations NL1, NL2, NL7). Thus, the NAND or NVM is sequentially programmed even if the LBAs of the zone 706 are not. The table 800 of FIG. 8 is then updated and a completion entry is returned to the completion queue of the host device to notify the host device that the data associated with the third command 734 has been stored in the selected logical blocks $712_1$, $712_2$, $712_7$ identified by the host device.

Figure 7E:
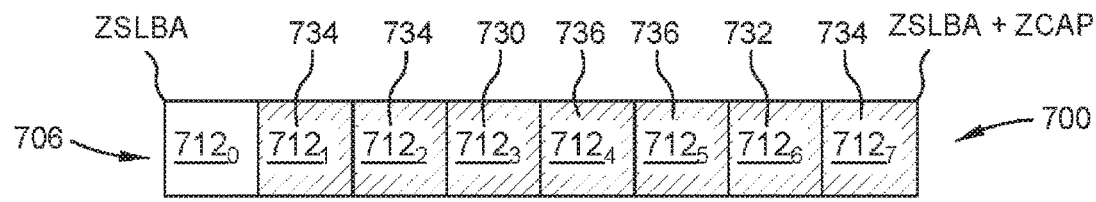

FIG. 7E illustrates the zone 706 after a fourth command 736 to the zone 706 has been retrieved from the host device and the data associated with the fourth command 736 has been written to the fifth logical block $712_4$ and the sixth logical block $712_5$ of the zone 706. The host again identifies which logical blocks 712 of the zone 706 to write the data associated with the fourth command 736 to, which requires more than one logical block 712. The host device may select any available logical blocks 712 of the zone 706 between the ZSLBA and the ZSLBA+ZCAP except the second through fourth logical blocks $712_1$-$712_3$, the seventh logical block $712_6$, and the eighth logical block $712_7$, which are already storing the state associated with the first, second, and third commands 730, 732, 734. The selection of logical blocks 712 by the host device need not be sequential; however, the host device may select sequential logical blocks if it so chooses. For example, the data associated with the fourth command 736 will be stored in the fourth and fifth logical blocks $712_3$, $712_4$.

The controller then retrieves the fourth command 736, DMA reads the data associated with the fourth command 736, and writes the data to the selected logical blocks 712 (i.e., the fourth and fifth logical blocks $712_3$, $712_4$) identified by the host device. While the data associated with the fourth command 736 is programmed to the fourth and fifth logical blocks $712_3$, $712_4$, the NAND address associated with the fourth and fifth logical blocks $712_3$, $712_4$ may be the next available NLs in the NAND or NVM of the storage device (i.e., the corresponding LBA pointer points to the next available NLs in the NAND). For example, the NAND address of the data of the fourth command 736 may be the sixth and seventh NAND locations NL5, NL6. With conventional zone append commands, the fourth and fifth logical blocks $712_3$, $712_4$ correspond to the fourth and fifth NLs in the NAND, respectively (e.g., the fourth and fifth NAND location NL3, NL4). Thus, the NAND or NVM is sequentially programmed even if the LBAs of the zone 706 are not. The table 800 of FIG. 8 is then updated and a completion entry is returned to the completion queue of the host device to notify the host device that the data associated with the fourth command 736 has been stored in the selected logical blocks 712$_3$, 712$_4$ identified by the host device.

Figure 7F:
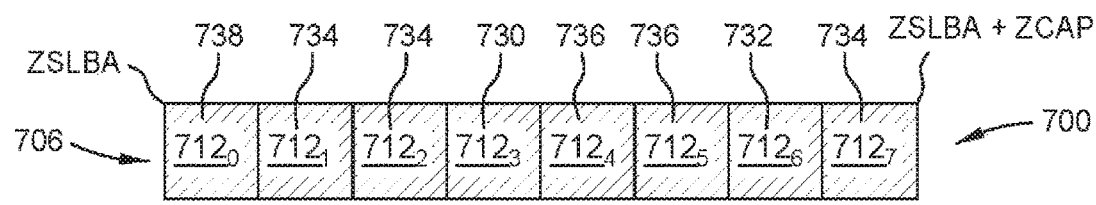

FIG. 7F illustrates the zone 706 after a fifth command 738 to the zone 706 has been retrieved from the host device and the data associated with the fifth command 738 has been written to the first logical block 712$_0$ of the zone 706. The host again identifies which logical block 712 of the zone 706 to write the data associated with the fifth command 738 to. The host device may select any available logical blocks 712 of the zone 706 between the ZSLBA and the ZSLBA+ZCAP except the second through eighth logical blocks 712$_1$-712$_7$, which are already storing the state associated with the first through fourth commands 730-736.

The controller then retrieves the fifth command 738, DMA reads the data associated with the fifth command 738, and writes the data to the selected logical blocks 712 (i.e., the first logical block 712$_0$) identified by the host device. While the data associated with the fifth command 738 is programmed to the first logical block 712$_0$, the NAND address associated with the first logical block 712$_0$ may be the next available NL in the NAND or NVM of the storage device (i.e., the corresponding LBA pointer points to the next available NL in the NAND). For example, the NAND address of the data of the fifth command 738 may be an eighth NAND location NL7. With conventional zone append commands, the first logical block 712$_0$ corresponds to a first NL in the NAND (e.g., a first NAND location NL0). Thus, the NAND or NVM is sequentially programmed even if the LBAs of the zone 706 are not. The table 800 of FIG. 8 is then updated and a completion entry is returned to the completion queue of the host device to notify the host device that the data associated with the fifth command 738 has been stored in the selected logical blocks 712$_0$ identified by the host device.

Upon writing the data associated with the fifth command 738 to the first logical block 712$_0$, the zone 706 is in the full state, and the capacity of the zone 706 is completely utilized. A full zone is one that is completely filled with data, and has no more available blocks to write data to. Read commands of data stored in full zones may still be executed. The ZM may reset a full zone, scheduling an erasure of the data stored in the zone such that the zone switches back to an empty zone. Once the zone 706 is erased of data, switched to the erase state, and then switched to the active state, the host device may select logical blocks 712 of the zone 706 to write data to in any order according to the method described above. The host device is not limited to writing data to the zone 706 in the same sequence as described above, but may select any available logical block 712 in any order.

Upon erasing the zone 706, the LBA pointers all point to a default value meaning no physical location, such as NULL, 0x0000, 0xFFFF, or the like. As each write is received by the controller, the data is written to the next NAND location while concurrently checking the existing LBA value to ensure that it was pointing to NULL. If the LBA value was not pointing to NULL in the tracking table 800, then the controller determines that this is not the first time the LBA was written during this duration through the zone active state. The write can optionally be rejected because the host is not abiding by the new rules to write each LBA only a single time. The rejection of the write and safety feature enables the storage device to maintain sequential write traffic and ensures that the background garbage collection feature may continue to be turned off.

Conversely, in conventional methods, once a zone gets erased, all LBAs are pointing to a sentinel value, such as NULL, 0x0000, 0xFFFF, or the like. As the writes sequentially fill a zone, each LBA that is written to points to the next NAND location where the data was placed. Concurrently, the LBA of the current write is checked to determine only if it is sequential to the last write LBA.

Utilizing non-sequential writing to the zone, as described in FIGS. 7-8, rather than using zone append commands, enables the storage device to cut-down on the amount of work performed, as the storage device tracks the write but does not have to track and update a write pointer. Moreover, unlike with zone append commands, the host device gets to decide the LBA for storing data. As such, both the storage device performance and the host performance are increased, and the storage device overhead is decreased.

A host device that gets to decide the LBA for storing the data may be able to use this advantage to avoid race conditions. This enables some existing structures in host side applications to continue without modification. For example, some host side applications have one entity aware of all available storage LBAs, and this entity will administer write locations to other host applications. Utilizing non-sequential writing to the zone, as described in FIGS. 7-8, the other applications in the host are allowed to hold their assigned LBAs and consume their assigned LBAs at a later time. As such, no danger of non-sequential writes to zones exists. Since the storage device can turn off a sequentially write check, the endurance of the storage device is improved. The endurance of the storage device is maintained, as the incoming data can still be placed on the next available NAND location.

In one embodiment, a storage device comprises a media unit, wherein a capacity of the media unit is divided into a plurality of zones, each zone comprising a plurality of logical blocks, and a controller coupled to the media unit. The controller is configured to retrieve a first command to write data to a first zone and DMA read data associated with the first command, identify one or more first logical blocks of the first zone to write the data associated with the first command to, wherein the one or more first logical blocks are between a zone starting logical block address of the first zone and a zone capacity of the first zone, retrieve a second command to write data to the first zone and DMA read data associated with the second command, and identify one or more second logical blocks of the first zone to write the data associated with the second command to, wherein the one or more second logical blocks are between the zone starting logical block address of the first zone and the zone capacity of the first zone, and wherein the one or more second logical blocks are spaced from the one or more first logical blocks by one or more empty logical blocks.

The controller is further configured to write the data associated with the first command prior to retrieving the second command to write data and write the data associated with the second command after identifying one or more second logical blocks of the first zone. The controller is further configured to return a first completion entry to a completion queue of a host device after writing the data associated with the first command and return a second completion entry to the completion queue of the host device after writing the data associated with the second command. The controller is further configured to update one or more tracking tables after writing the data associated with the first command to indicate that the one or more first logical blocks are unavailable to write data associated with subsequent commands to after returning the first completion entry and update the one or more tracking tables after writing the data associated with the second command to indicate that the one or more second logical blocks are unavailable to write data associated with subsequent commands to after returning the second completion entry.

The one or more tracking tables comprise a first tracking table stored in the storage device and a second tracking table stored in the host device. The host device selects the one or more second blocks for storing the data associated with the second command using the second tracking table. A host device selects the one or more first blocks for storing the data associated with the first command.

In another embodiment, a storage device comprises a media unit, wherein a capacity of the media unit is divided into a plurality of zones, each zone comprising a plurality of logical blocks, and a controller coupled to the media unit. The controller is configured to retrieve a first command to write data to one or more first logical blocks in a first zone, wherein the one or more first logical blocks are between a zone starting logical block address of the first zone and a zone capacity of the first zone, write the data associated with the first command to the one or more first logical blocks of the first zone and to a first location in the media unit, retrieve a second command to write data to one or more second logical blocks in the first zone, wherein the one or more second logical blocks are between the zone starting logical block address of the first zone and the zone capacity of the first zone, and wherein the one or more second logical blocks are non-sequential to the first one or more logical blocks, and write the data associated with the second command to the one or more second logical blocks of the first zone and to a second location in the media unit, the second location being located sequential to the first location.

The controller is further configured to retrieve a third command to write data to one or more third logical blocks in the first zone, wherein the one or more third logical blocks are between the zone starting logical block address of the first zone and the zone capacity of the first zone, and wherein the one or more third logical blocks are non-sequential to the one or more second logical blocks and write the data associated with the third command to the one or more third logical blocks of the first zone and to a third location in the media unit, the third location being located sequential to the second location. The data associated with the second command is written to two or more second logical blocks, and the two or more second logical blocks are non-sequential to one another. A host device selects the one or more first blocks for storing the data associated with the first command and the one or more second logical blocks for storing the data associated with the second command.

The controller is further configured to return a first completion entry to a completion queue of a host device after writing the data associated with the first command and update one or more tracking tables after writing the data associated with the first command to indicate that the one or more first logical blocks are unavailable to write data associated with subsequent commands to. At least one of the one or more tracking tables is stored in the media unit of the storage device.

In yet another embodiment, a storage system comprises a host device, the host device comprising a first tracking table and a storage system. The storage system comprises a media unit, wherein a capacity of the media unit is divided into a plurality of zones, each zone comprising a plurality of logical blocks, and wherein the media unit stores a second tracking table and a controller coupled to the media unit. The controller is configured to retrieve a first command to write data to one or more first logical blocks in a first zone and DMA read data associated with the first command, wherein the one or more first logical blocks are between a zone starting logical block address of the first zone and a zone capacity of the first zone, write the data associated with the first command to the one or more first logical blocks of the first zone, update the first and second tracking tables to indicate that the one or more first logical blocks are unavailable to write data associated with subsequent commands to, retrieve a second command to write data to one or more second logical blocks in the first zone and DMA read data associated with the second command, wherein the one or more second logical blocks are between the zone starting logical block address of the first zone and the zone capacity of the first zone, and wherein at least one of the one or more second logical blocks are non-sequential to the one or more first logical blocks, write the data associated with the second command to the one or more second logical blocks of the first zone; and update the first and second tracking tables to indicate that the one or more second logical blocks are unavailable to write data associated with subsequent commands to.

The controller is further configured to retrieve a third command to write data to one or more third logical blocks in the first zone and DMA read data associated with the third command, wherein the one or more third logical blocks are between the zone starting logical block address of the first zone and the zone capacity of the first zone, and wherein the one or more third logical blocks are non-sequential to at least the one or more second logical blocks, write the data associated with the third command to the one or more third logical blocks of the first zone, and update the first and second tracking tables to indicate that the one or more third logical blocks are unavailable to write data associated with subsequent commands to. The controller is further configured to retrieve a third command to write data to two or more third logical blocks in the first zone and DMA read data associated with the third command, wherein the two or more third logical blocks are between the zone starting logical block address of the first zone and the zone capacity of the first zone, and wherein at least one of the two or more third logical blocks are disposed between the first one or more logical blocks and the one or more second logical blocks, write the data associated with the third command to the two or more third logical blocks of the first zone, and update the first and second tracking tables to indicate that the two or more third logical blocks are unavailable to write data associated with subsequent commands to.

The controller is further configured to retrieve a third command to write data to two or more third logical blocks in the first zone and DMA read data associated with the third command, wherein the two or more third logical blocks are between the zone starting logical block address of the first zone and the zone capacity of the first zone, and wherein at least one of the two or more third logical blocks is sequentially located before the one or more first logical blocks or the one or more second logical blocks, write the data associated with the third command to the two or more third logical blocks of the first zone, and update the first and second tracking tables to indicate that the two or more third logical blocks are unavailable to write data associated with subsequent commands to. The host device selects the one or more first blocks for storing the data associated with the first command and the one or more second logical blocks for storing the data associated with the second command based on the first tracking table.

The controller is further configured to return a first completion entry to a completion queue of the host device after writing the data associated with the first command, and wherein the host device updates the first tracking table after receiving the first completion entry. The data associated with the second command is written to two or more second logical blocks, and wherein the two or more second logical blocks are spaced from one another by one or more empty logical blocks or more first logical blocks.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
a media unit, wherein a capacity of the media unit is divided into a plurality of zones, each zone comprising a plurality of logical blocks; and
a controller coupled to the media unit, the controller configured to:
retrieve a first command to write data to a first zone and direct memory access (DMA) read data associated with the first command;
identify one or more first logical blocks of the first zone to write the data associated with the first command to, wherein the one or more first logical blocks are between a zone starting logical block address of the first zone and a zone capacity of the first zone;
write the data associated with the first command to the one or more first logical blocks of the first zone;
retrieve a second command to write data to the first zone and DMA read data associated with the second command;
identify one or more second logical blocks of the first zone to write the data associated with the second command to, wherein the one or more second logical blocks are between the zone starting logical block address of the first zone and the zone capacity of the first zone, and wherein the one or more second logical blocks are spaced from the one or more first logical blocks by one or more empty logical blocks;
write the data associated with the second command to the one or more second logical blocks of the first zone while the one or more empty logical blocks remain empty after DMA reading the data associated with the second command; and
retrieve one or more additional commands to write data to the first zone and write the data associated with the one or more additional commands to one or more available logical blocks within the first zone, sequentially or non-sequentially, until the first zone reaches the zone capacity, wherein upon the first zone reaching the zone capacity, erasure of all data stored within the first zone is scheduled.

2. The storage device of claim 1, wherein the controller is further configured to:
write the data associated with the first command prior to retrieving the second command to write data.

3. The storage device of claim 2, wherein the controller is further configured to:
return a first completion entry to a completion queue of a host device after writing the data associated with the first command; and
return a second completion entry to the completion queue of the host device after writing the data associated with the second command.

4. The storage device of claim 3, wherein the controller is further configured to:
update one or more tracking tables after writing the data associated with the first command to indicate that the one or more first logical blocks are unavailable to write data associated with subsequent commands to after returning the first completion entry; and
update the one or more tracking tables after writing the data associated with the second command to indicate that the one or more second logical blocks are unavailable to write data associated with subsequent commands to after returning the second completion entry.

5. The storage device of claim 4, wherein the one or more tracking tables comprise a first tracking table stored in the storage device and a second tracking table stored in the host device.

6. The storage device of claim 5, wherein the host device selects the one or more second blocks for storing the data associated with the second command using the second tracking table.

7. The storage device of claim 1, wherein a host device selects the one or more first blocks for storing the data associated with the first command.

8. A storage device, comprising:
a media unit, wherein a capacity of the media unit is divided into a plurality of zones, each zone comprising a plurality of logical blocks; and
a controller coupled to the media unit, the controller configured to:
retrieve and read a first command to write data to one or more first logical blocks in a first zone, wherein the one or more first logical blocks are between a zone starting logical block address of the first zone and a zone capacity of the first zone;
write the data associated with the first command to the one or more first logical blocks of the first zone and to a first location in the media unit directly after reading the first command;
retrieve and read a second command to write data to one or more second logical blocks in the first zone, wherein the one or more second logical blocks are between the zone starting logical block address of the first zone and the zone capacity of the first zone, and wherein the one or more second logical blocks are non-sequential to the first one or more logical blocks;
write the data associated with the second command to the one or more second logical blocks of the first zone and to a second location in the media unit while one or more empty logical blocks remain empty between the one or more first logical blocks and the one or more second logical blocks after reading the second command, the second location being located sequential to the first location; and
retrieve one or more additional commands to write data to the first zone and write the data associated with the one or more additional commands to one or more available logical blocks within the first zone, sequentially or non-sequentially, until the first zone reaches the zone capacity, wherein upon the first zone reaching the zone capacity, erasure of all data stored within the first zone is scheduled.

9. The storage device of claim 8, wherein prior to retrieving the one or more additional commands, the controller is further configured to:
retrieve a third command to write data to one or more third logical blocks in the first zone, wherein the one or more third logical blocks are between the zone starting logical block address of the first zone and the zone capacity of the first zone, and wherein the one or more third logical blocks are non-sequential to the one or more second logical blocks; and write the data associated with the third command to the one or more third logical blocks of the first zone and to a third location in the media unit, the third location being located sequential to the second location.

10. The storage device of claim 8, wherein the data associated with the second command is written to two or more second logical blocks, and wherein the two or more second logical blocks are non-sequential to one another.

11. The storage device of claim 8, wherein a host device selects the one or more first blocks for storing the data associated with the first command and the one or more second logical blocks for storing the data associated with the second command.

12. The storage device of claim 8, wherein prior to retrieving the one or more additional commands, the controller is further configured to:

return a first completion entry to a completion queue of a host device after writing the data associated with the first command; and update one or more tracking tables after writing the data associated with the first command to indicate that the one or more first logical blocks are unavailable to write data associated with subsequent commands to.

13. The storage device of claim 12, wherein at least one of the one or more tracking tables is stored in the media unit of the storage device.

14. A storage system, comprising:

a host device, the host device comprising a first tracking table; and a storage system, wherein the storage system comprises:

a media unit, wherein a capacity of the media unit is divided into a plurality of zones, each zone comprising a plurality of logical blocks, and wherein the media unit stores a second tracking table; and a controller coupled to the media unit, the controller configured to:

retrieve a first command to write data to one or more first logical blocks in a first zone and DMA read data associated with the first command, wherein the one or more first logical blocks are between a zone starting logical block address of the first zone and a zone capacity of the first zone;

write the data associated with the first command to the one or more first logical blocks of the first zone directly after retrieving the first command and DMA reading the data associated with the first command;

update the first and second tracking tables to indicate that the one or more first logical blocks are unavailable to write data associated with subsequent commands to;

retrieve a second command to write data to one or more second logical blocks in the first zone and DMA read data associated with the second command, wherein the one or more second logical blocks are between the zone starting logical block address of the first zone and the zone capacity of the first zone, and wherein at least one of the one or more second logical blocks are non-sequential to the one or more first logical blocks;

write the data associated with the second command to the one or more second logical blocks of the first zone while one or more empty logical blocks remain empty between the one or more first logical blocks and the at least one of the one or more second logical blocks after retrieving the second command and DMA reading the data associated with the second command;

update the first and second tracking tables to indicate that the one or more second logical blocks are unavailable to write data associated with subsequent commands to; and retrieve one or more additional commands to write data to the first zone and write the data associated with the one or more additional commands to one or more available logical blocks within the first zone, sequentially or non-sequentially, until the first zone reaches the zone capacity, wherein upon the first zone reaching the zone capacity, erasure of all data stored within the first zone is scheduled.

15. The storage system of claim 14, wherein prior to retrieving the one or more additional commands, the controller is further configured to:

retrieve a third command to write data to one or more third logical blocks in the first zone and DMA read data associated with the third command, wherein the one or more third logical blocks are between the zone starting logical block address of the first zone and the zone capacity of the first zone, and wherein the one or more third logical blocks are non-sequential to at least the one or more second logical blocks;

write the data associated with the third command to the one or more third logical blocks of the first zone; and update the first and second tracking tables to indicate that the one or more third logical blocks are unavailable to write data associated with subsequent commands to.

16. The storage system of claim 14, wherein prior to retrieving the one or more additional commands, the controller is further configured to:

retrieve a third command to write data to two or more third logical blocks in the first zone and DMA read data associated with the third command, wherein the two or more third logical blocks are between the zone starting logical block address of the first zone and the zone capacity of the first zone, and wherein at least one of the two or more third logical blocks is disposed between the one or more first logical blocks and the one or more second logical blocks;

write the data associated with the third command to the two or more third logical blocks of the first zone; and update the first and second tracking tables to indicate that the two or more third logical blocks are unavailable to write data associated with subsequent commands to.

17. The storage system of claim 14, wherein prior to retrieving the one or more additional commands, the controller is further configured to:

retrieve a third command to write data to two or more third logical blocks in the first zone and DMA read data associated with the third command, wherein the two or more third logical blocks are between the zone starting logical block address of the first zone and the zone capacity of the first zone, and wherein at least one of the two or more third logical blocks are sequentially located before the first one or more logical blocks or the one or more second logical blocks;

write the data associated with the third command to the two or more third logical blocks of the first zone; and update the first and second tracking tables to indicate that the two or more third logical blocks are unavailable to write data associated with subsequent commands to.

18. The storage system of claim 14, wherein the host device selects the one or more first blocks for storing the data associated with the first command and the one or more second logical blocks for storing the data associated with the second command based on the first tracking table.

19. The storage system of claim 18, wherein the controller is further configured to return a first completion entry to a completion queue of the host device after writing the data associated with the first command, and wherein the host device updates the first tracking table after receiving the first completion entry.

20. The storage system of claim 14, wherein the data associated with the second command is written to two or more second logical blocks, and wherein the two or more second logical blocks are spaced from one another by one or more empty logical blocks or at least one of the one or more first logical blocks.

* * * * *